(12) United States Patent
Cheng

(10) Patent No.: US 8,076,858 B2
(45) Date of Patent: Dec. 13, 2011

(54) LIGHT SENSING APPARATUS AND METHOD FOR LUMINAIRE CALIBRATION

(75) Inventor: Yu-Chun Cheng, Taipei (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 701 days.

(21) Appl. No.: 12/230,003

(22) Filed: Aug. 21, 2008

(65) Prior Publication Data

US 2009/0278462 A1    Nov. 12, 2009

(30) Foreign Application Priority Data

May 6, 2008    (CN) .......................... 2008 1 0027997

(51) Int. Cl.
| | |
|---|---|
| H05B 37/02 | (2006.01) |
| H05B 39/04 | (2006.01) |
| H05B 41/36 | (2006.01) |
| H05B 39/02 | (2006.01) |
| H05B 37/00 | (2006.01) |
| H05B 39/00 | (2006.01) |
| H05B 41/00 | (2006.01) |
| G05F 1/00 | (2006.01) |

(52) U.S. Cl. .................... 315/153; 315/209 R; 315/210; 315/291; 315/294; 315/307; 315/312

(58) Field of Classification Search .................... 315/153
See application file for complete search history.

(56) References Cited

U.S. PATENT DOCUMENTS

| | | | | |
|---|---|---|---|---|
| 6,069,676 | A | * | 5/2000 | Yuyama .......................... 349/62 |
| 6,127,783 | A | | 10/2000 | Pashley et al. |
| 6,495,964 | B1 | | 12/2002 | Muthu et al. |
| 7,140,751 | B2 | * | 11/2006 | Lin ........................... 362/249.02 |
| 7,183,718 | B2 | * | 2/2007 | Yoshida ........................ 315/153 |
| 2006/0006821 | A1 | * | 1/2006 | Singer et al. ................... 315/312 |
| 2009/0174331 | A1 | * | 7/2009 | Tanaka ............................ 315/151 |

* cited by examiner

*Primary Examiner* — Douglas W Owens
*Assistant Examiner* — Dedei K Hammond

(57) ABSTRACT

A light sensing apparatus and method for luminaire calibration are provided. Since the lighting frequencies of LEDs are modulated in sequence and a light sensing unit is activated and deactivated periodically, the light intensity received from each LED channel can be measured in sequence. In particular, only the light signals from one channel at one time can be sensed. Further, the received light signals for each channel are compared with the ideal value, and the result can be used for LEDs' calibration. According to the preferred embodiment of the invention, the sensing apparatus includes a plurality of LEDs, regulators, and single light sensing unit for retrieving the light intensities without any switching circuit should be installed. After that, the signals will be transmitted into a driving controller that can switch the light sensing unit, and the light sensing unit can measure the light intensities in a specific period.

10 Claims, 6 Drawing Sheets

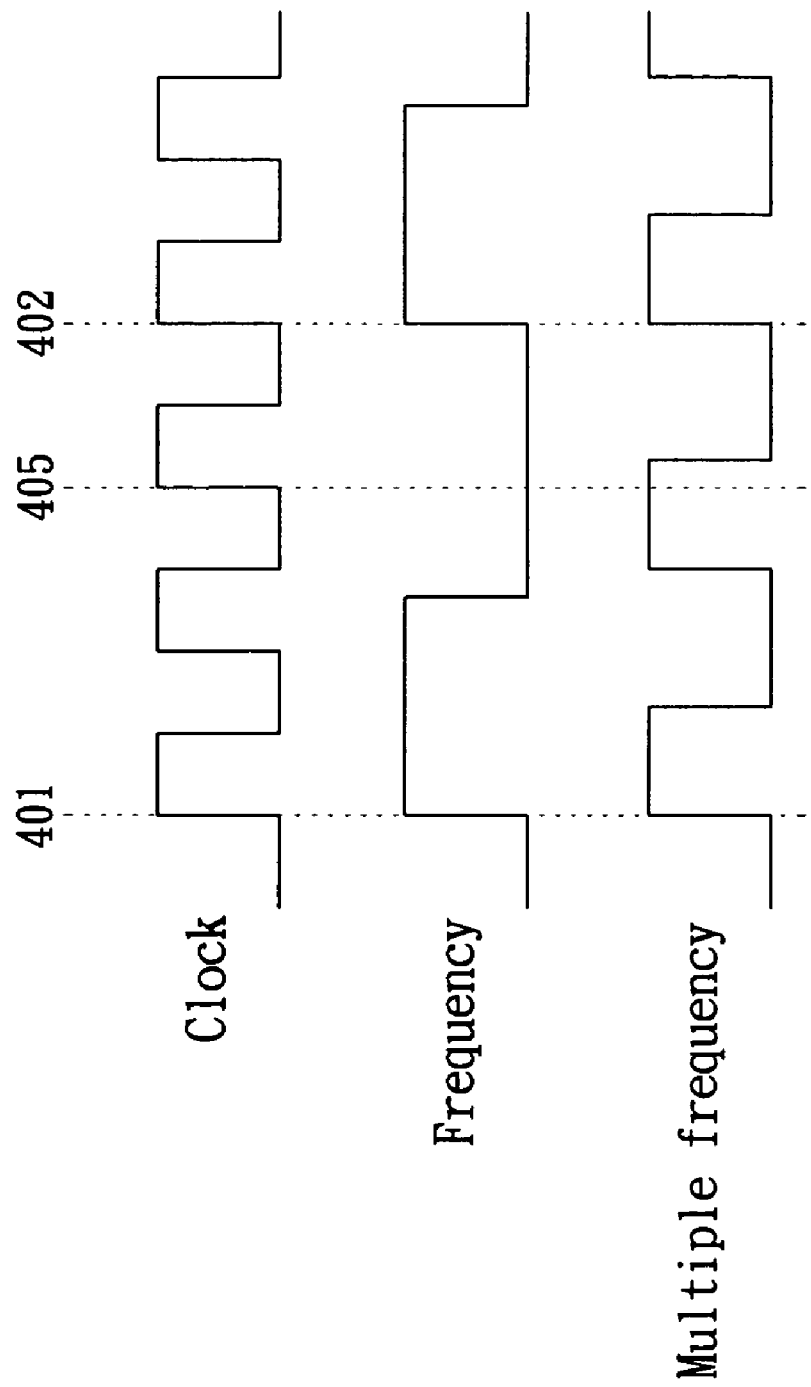

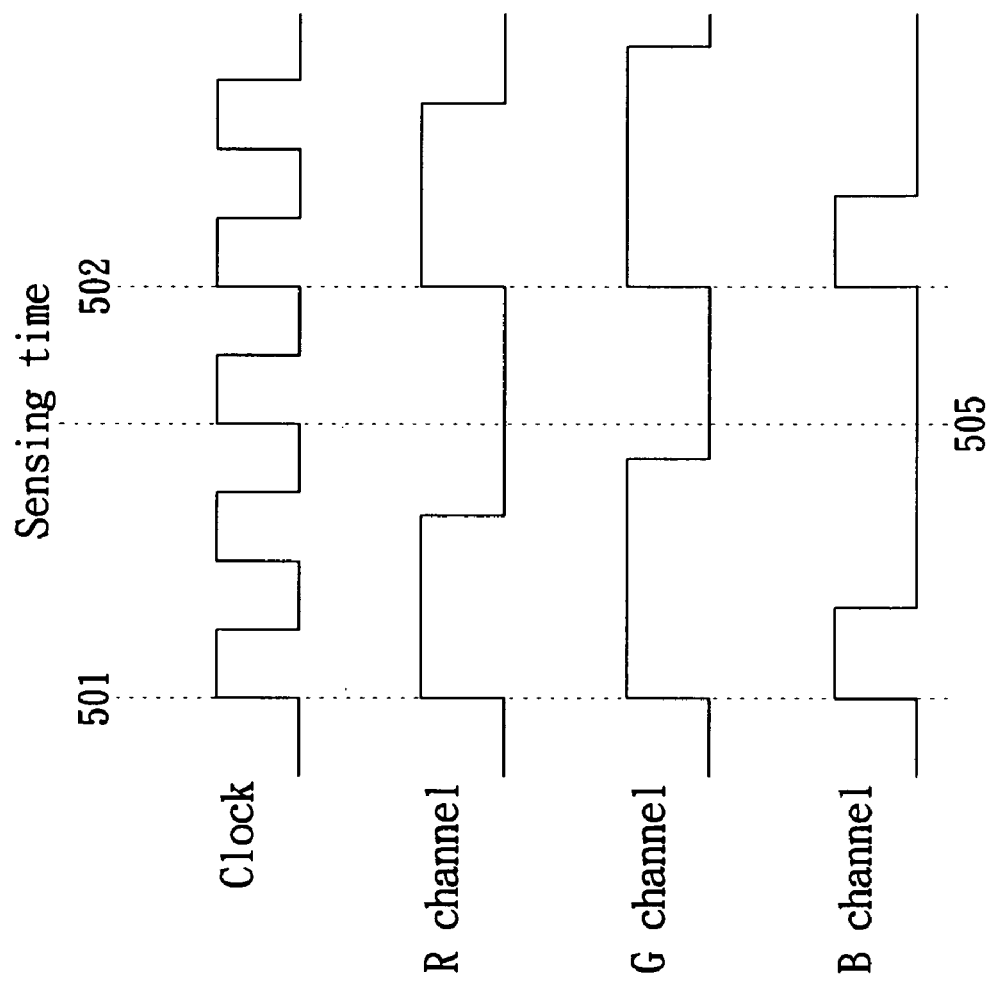

LIGHT SENSING APPARATUS AND METHOD FOR LUMINAIRE CALIBRATION

BACKGROUND OF THE INVENTION

1. Field of the Invention

The present invention relates to a light sensing apparatus and the method for luminaire calibration; more particularly, the light intensity for every LED can be measured in sequence by a frequency modulation scheme for further calibration.

2. Description of Related Art

With the usage of light emitting diodes (LED) in common luminaires, the illuminating quality of a plurality of LEDs is getting much attention. In the prior arts, some of them utilize a detection mechanism to modulate the chromatic characteristics of the luminaire automatically or manually.

Since the illuminating efficiency of the LED will be influenced often by the ambient circuit, driving current, the difference between the chips, or any change of the environmental temperature, a uniform illumination could not be obtained using LEDs as a light source. A detection scheme was provided in the prior art, by means of a modulation based on feedback information from the light emitted by the LEDs, for overcoming the drawback of the conventional LED luminaire.

The background art, such as the U.S. Pat. No. 6,127,783 (issued on Oct. 3, 2000), had provided a method for electronically adjusting the color balance of LED luminaires. As usual, the disclosed white light emitting luminaire includes a plurality of LEDs mixed with red, green and blue colors, and each of the colors uses separate power supply. Thus, a calibration mechanism is needed to adjust the output of the LED. For example, the output of each color is adjusted in response to the comparison between the measurement of the output and a default value, and it's to determine the power supplying the LED chip thereby.

Reference is made to FIG. 1, where an LED luminaire is shown to have a controller 17 used to adjust the current and lighting mode of the LEDs 10 by the regulators 11. A power converter 18 is used to convert the power to supply the current for the LEDs 10. The LEDs 10 can be the individual red, green and blue color, and then the colors are mixed as a white light through a diffuser 12.

In order to achieve the adjustment, a light sensor 14 shown in FIG. 1 is utilized. The light sensor 14 firstly measures the light emitted by the LEDs 10 through the diffuser 12. The sensed signals will be fed back to the controller 17, and the controller 17 performs a comparison between the feedback signals and a default value configured by an external control 16. Accordingly, the regulators 11 are used to adjust the current for each LED 10.

In another aspect, U.S. Pat. No. 6,495,964 issued on Dec. 17, 2002 further disclosed a scheme that instantly increases the drive current for the LED to compensate for the unstable state occurring after switching on or switching off the LED. A sensor made by photodiode is utilized to periodically measure the intensity of each LED in sequence. Since it is sufficient to compare and adjust the current for LED in a very short time, the LED-to-be-measured will be turned on in an instant period and the others are simultaneously turned off.

However, the luminosity of the LED will be insufficient or unstable in the very short time as the LED is turned on or turned off. In order to compensate for the luminosity, some conventional technologies used an extra circuit to increase the current instantly around the time to turn on or turn off the LED. Referring to FIG. 2, wherein the horizontal axis represents time and the vertical axis means current. The current shown as the numeral 20 in the diagram has a sudden rise around the time as the LED is turned off, namely the compensation pulses occurred before turning off the LED and after turning on the LED. That is to function as compensation by suddenly increasing the current.

SUMMARY OF THE INVENTION

The light sensing apparatus and method for the luminaire calibration of the present invention adopts a mechanism of pre-setting a specific switching cycle and periodically switching interval to provide a more efficient sensing method. This is in contrast to the prior art that senses the light emitted by an LED luminaire for calibration using an extra circuit used to switch the LEDs and suddenly increasing the current to compensate the brightness.

Particularly, the method of the present invention executes a frequency modulation for each channel, including R-channel, G-channel or B-channel to modulate the LED, and a light sensing unit is utilized to retrieve the light intensity completely in a pre-setting period. The light sensing unit is switched on or off based on a specific switching cycle. Thus, without any switching circuit for the LED should be installed, the light intensity of a specific LED can be sensed by the light sensing unit and the relevant parameters can also be adjusted. In this moment, no further flash occurred to the LED generated by the conventional switch.

According to the preferred embodiment of the present invention, a single light sensing unit is used to sense the light intensities of the plurality of light emitting diodes. The preferred embodiment of the light sensing apparatus for the luminaire calibration of the invention has a plurality of LEDs that are electrically connected with a plurality of regulating units. Those regulating units are used to regulate the current inputted to the LEDs. The light sensing unit is used to retrieve the light intensities of the LEDs, and transmit the sensed data to a driving controller that is electrically connected to the light sensing unit and for controlling the output power and the driving frequency. A switching unit is further used to switch the light sensing unit. Firstly, the base frequencies of the LEDs are synchronized by this driving controller, and then the means of frequency-modulation modulates the frequency for each LED. After that, the light sensing unit can sense the modulated LED in the pre-setting period. Moreover, the switching cycle of the switching unit for the light sensing unit can be changed in accordance with the use situation.

According to the preferred embodiment, the light sensing method for luminaire calibration has a first step of synchronizing the clocks of the channels of the LEDs based on an initial base frequency, so as to make the data transmission for each LED uniform. The illuminating frequency for each LED is modulated in sequence according to the pre-setting switching cycle of the light sensing unit that is switched on or off periodically. When the light sensing unit is activated, the light sensing unit retrieves the light signals from the LEDs' channels in sequence. As the sensing step completes, the LEDs are modulated to their own initial base frequencies in sequence. In particular, only the light signals from one channel can be sensed at one time by means of the frequency modulation for each LED, and a further calibration is executed according to the comparison between the sensed light signals and an ideal value.

BRIEF DESCRIPTION OF DRAWINGS

The present invention will be readily understood by the following detailed description in conjunction with the accompanying drawings, in which:

FIG. 4 shows a schematic diagram processing the frequency modulation means of the present invention;

FIGS. 5A and 5B are the timing diagram of the channels of the LEDs of the present invention.

DETAILED DESCRIPTION OF PREFERRED EMBODIMENTS

To allow the examiner to understand the technology, means and functions adopted in the present invention further, reference is made to the following detailed description and attached drawings. The examiner shall readily understand the invention deeply and concretely from the purpose, characteristics and specification of the present invention. Nevertheless, the present invention is not limited to the attached drawings and embodiments in following description.

Since the luminaire particularly using the light emitting diodes as light source will generate some color changes for long time operation, the present invention is to provide a light sensing apparatus and a method for the luminaire calibration. In the present invention, the luminosity of the LEDs can automatically be adjusted to the best condition by sensing and calibration mechanism, and further, it is provided a user interface for changing the LED's color. In which, a photodiode implements the light sensing unit for sensing the LED-based luminaire according to the preferred embodiment. After that, the parameters for each LED can be adjusted accordingly. The present invention adopts a mechanism of pre-setting a switching cycle and periodical switching interval to provide a more efficient sensing method, but no any extra circuit used to switch the LEDs or any other compensative measures to adjust the light output is needed. So that, any problem caused by ambient temperature changes or power supply fluctuations can be avoided.

By pre-setting a switching cycle and periodical switching interval, according to the provided light sensing apparatus and the sensing method, the light sensing unit can completely retrieve the light intensities of the LEDs having respective red, green and blue colors in a specific period. The light sensing unit for sensing the light emitted by LEDs is switched on or off based on the switching cycle in response to the base frequency of the plurality of LEDs after synchronization by a driving controller. By means of the frequency modulation, the light sensing unit executes the sensing step to the specific LED at one time in the periodical switching interval without any switching circuit needed for sensing the LEDs. Additionally, the flash occurred to the LEDs as sensing the light in the conventional technology can be improved.

After the light sensing apparatus processing the sensing steps to each LED, the sensed data is used to be compared with the pre-setting value for each channel of the LEDs. The comparison results in the signals outputted from the driving controller for adjusting the output of the LED-based luminaire for automatic calibration.

Figure 1:
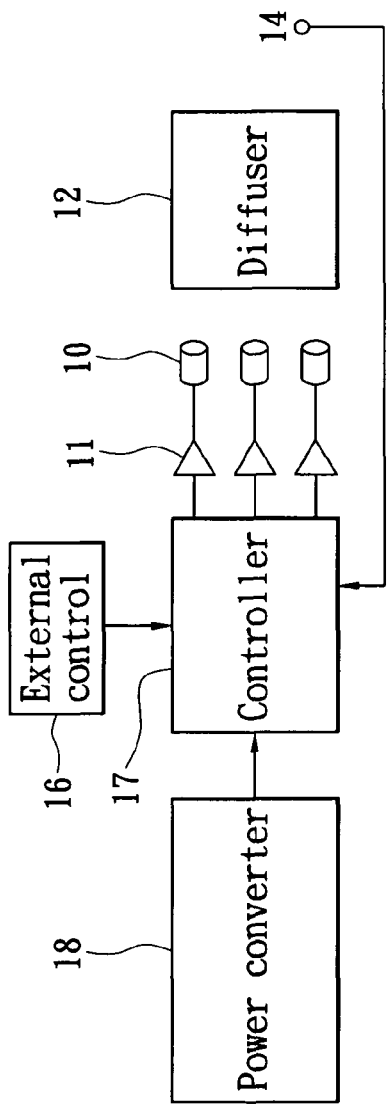
FIG. 1 is a schematic diagram of the LED luminaire of the prior art.
Figure 2:
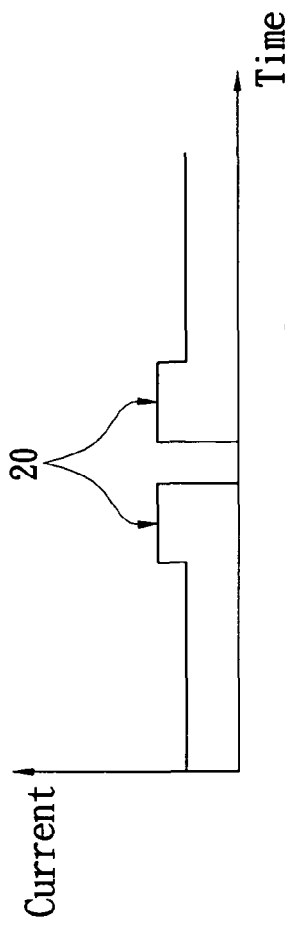
FIG. 2 shows a schematic diagram of the current compensation before and after the conventional LED is switched off.
Figure 3:
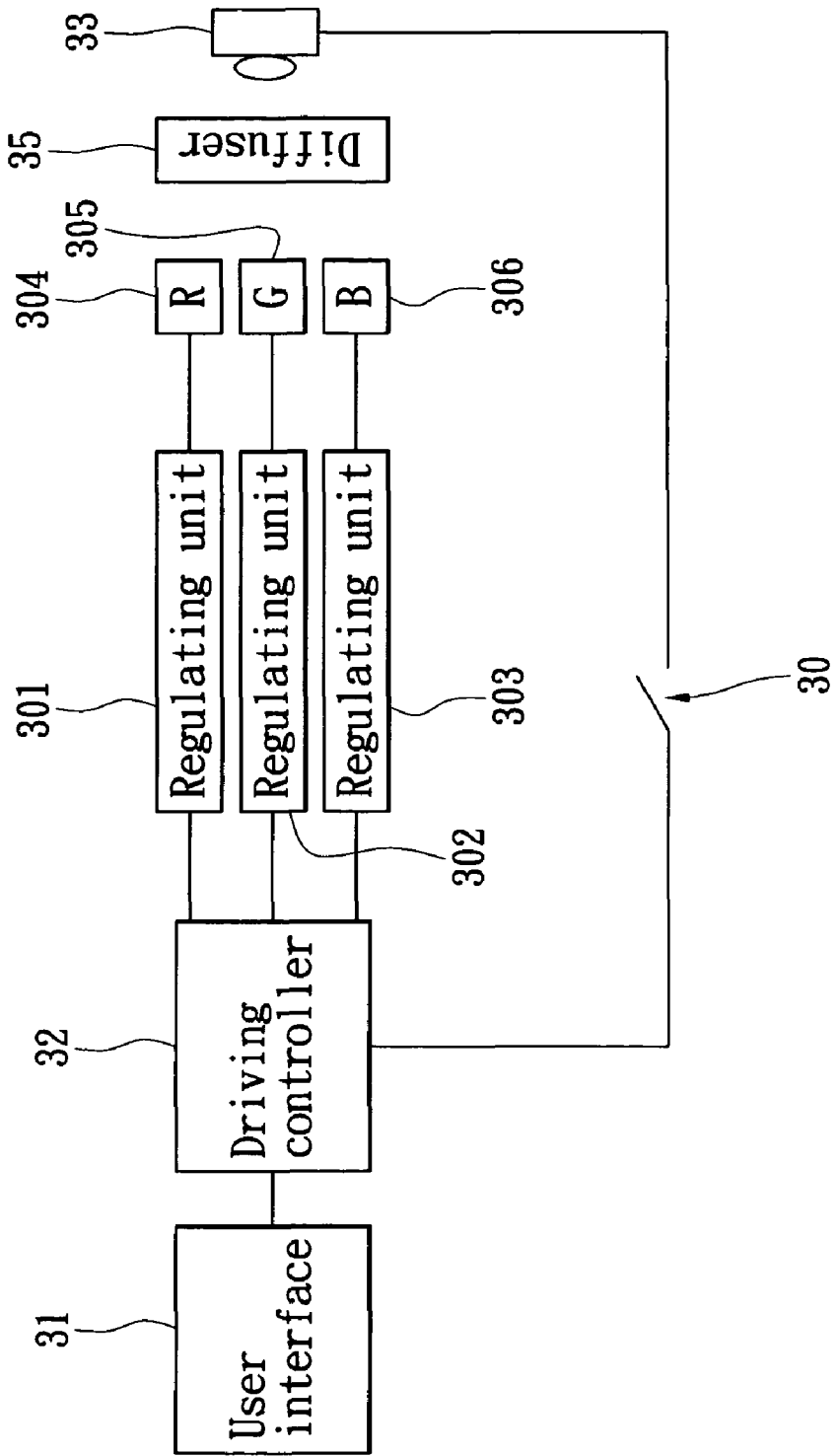
FIG. 3 shows a schematic diagram of the embodiment of the light sensing apparatus for LED luminaire calibration according to the present invention.

Reference is made to FIG. 3 showing a schematic diagram of the embodiment of the light sensing apparatus used for luminaire calibration according to the present invention. The major elements including a plurality of LEDs 304, 305 and 306 are depicted. The respective red (R), green (G) and blue (B) colors forming the white-light luminaire are shown in this diagram, or the luminaire having the other combinations of LEDs, such as one single color, one single monochromatic or multiple LEDs, that form the other colors can also be included in the present invention.

In the present embodiment, the plurality of LEDs 304, 305 and 306 are electrically connected to a plurality of regulating units 301, 302 and 303 respectively. The regulating units 301, 302 and 303 can regulate the currents inputted to the LEDs respectively.

The light sensing apparatus mainly drives the illuminating frequencies and switching actions of the LEDs 304, 305 and 306 through a driving controller 32. The driving controller 32 is further used to control the output power and driving frequencies of the LEDs. Moreover, the regulating units 301, 302 and 303 are electrically connected to the driving controller. 32, and used to regulate the current supplied for the LEDs. The driving controller 32 can be used to adjust the various lighting parameters, such as the chroma and light intensity, besides to drive the LEDs.

Still further, a driving controller 32 is electrically connected to a light sensing unit 33 which can be implemented as a single photodiode. A diffuser 35, according to the requirement, installed between the light sensing unit 33 and the LEDs 304, 305 and 306 is used to advance the accuracy as sensing the light intensities. Some respective channels are formed with the signals generated by the LEDs 304, 305 and 306, and the signals, such as the light intensities, from the channels are sensed by the light sensing unit 33.

After that, the driving controller 32 retrieves the sensed signals from the light sensing unit 33, for further calibration. The calibration is executed in accordance with the comparison between the sensed signals and the pre-setting ideal values. The lighting parameters of the LEDs are regulated through the inputted current. A pulse-width modulation (PWM) circuit is used to modulate the outputted pulse width for changing the current according to the preferred embodiment of the present invention. Furthermore, a voltage stabilizing circuit (not shown) can be included in the driving controller 32 for stabilizing the output of the LEDs 304, 305 and 306. The light sensing apparatus of the present invention not only can stabilize the output of the LEDs, but also being applicable to the various chip designs, so that the light sensing apparatus of the present invention can be preferably disposed in the general control circuit of the LEDs. The output quality of the light sensing apparatus of the present invention won't be changed as the temperature or time varies.) More, a user interface 31 electrically connected with the driving controller 32 is provided for the external control, thereby the users can input the relevant lighting parameters therethrough. Based on the mentioned comparison, the driving controller 32 can regulate the lighting parameters including chroma or intensities of the LEDs 304, 305 and 306 through the regulating units 301, 302 and 303 by request.

While under operation as the light sensing unit 33 activates, the light intensity is sensed. In the very beginning, there is no data to be sensed. After a while, the signals will be retrieved through one of channels (such as R channel) after processing the base frequency modulation. The retrieved signals, such as the light intensity, represent the R-channel value, and they will be transmitted to the driving controller 32 through an amplifier (not shown in the diagram). Then the driving controller 32 executes a comparison between the sensed value and an ideal value of the initial R-channel. If any difference exists by the comparison, in order to be identical value, the voltage stabilizing circuit (not shown in the diagram) is driven to adjust its voltage and current for fixing the color shift.

Particularly, the light sensing apparatus of the present invention provides a means of frequency-modulation to modulate the frequencies of the LEDs. As illustrated in FIG. 4, the frequency is doubled. The mentioned light sensing unit 33 can sense the light intensity from the LEDs in a specific period since the light sensing unit 33 is periodically switched on or off through a switching unit 30. The switching unit 30 of the preferred embodiment is disposed between the light sensing unit 33 and the driving controller 32, and its switching timing is controlled by the driving controller 32. The switching unit 30 can also be a software switch programmed in the driving controller 32, and produced by an inside firmware of the driving controller 32. That is, the switching timing is controlled by a program installed in the driving controller 32.

The aforementioned frequency modulation is illustrated in the exemplary timing diagram of FIG. 4. In the very beginning, the clock of each LED's channel will be synchronized based on a base clock. The positions referring to numerals 401 and 402 of the timing clocks, which have the various frequency widths generated by a light source, are calibrated to correctly align with a stable clock generated by system.

The numeral 405 indicates a sensing timing, and the light sensing unit 33 is activated for operation in a period around this sensing timing. FIG. 4 shows the embodiment with a frequency doubled example at the third line, wherein the frequency width of the light becomes half. Under the original situation without frequency modulation, the light source with the original frequency won't be sensed around the sensing timing (405). Obviously, the light source with the frequency modulation will be sensed in the instant around the sensing timing (405) for further measurement.

The illuminating frequencies of the LEDs are modulated in sequence as double, triple frequency or the like by means of the frequency modulation as shown in FIG. 4. Therefore the light generated by each LED can be sure sensed by the light sensing unit 33 in a specific period, more particularly, the light intensities of LEDs are sensed by the light sensing unit 33 in sequence. According to the frequency modulation mechanism provided by the present invention, there is no need of any switch circuit for controlling the LEDs since the signals from the channels of LEDs can be retrieved in sequence by means of frequency modulation through the light sensing unit 33.

FIG. 5A shows the timing diagram for each channel of the LED of the embodiment of the present invention. A reference clock with a regular cycle is shown at first line. The other three lines respectively show the clocks with the R-channel for red color, G-channel for green color, and B-channel for blue color.

Those three channels will have the same base frequency (base clock) such as the indications 501 and 502 after the clocks for each channel are synchronized. Otherwise, if the channels are not synchronized, a calibration process based on the base clock is needed in order to make the data transmission uniform for further accurate measurement. According to one of the embodiments, the pulse-width with the same frequency is used to modulate the current for the LEDs for changing the colors, and this pulse-width modulation is to change the current proportioned to the pulse width.

According to the best mode the present invention offers, 1 to 10% of the total band width is reserved for the light sensing unit 33 sensing each color's channel. Since the frequency is modulated in a very short time such as the sensing time 505, the color-depth will oppositely decrease in the short time. If the raising time after activating the light sensing unit 33 is about 70 ps~200 ps (around 5 KHz~14.3 KHz, and 250~1700 nm in spectrum), at least 1 ns should be reserved for the light sensing unit 33 retrieving the light intensity completely as modulation. The light sensing unit 33 is switched on and off in accordance with the pre-setting cycle set for sensing in the specific period.

In the aforementioned embodiment, the frequency is modulated in a range of 100 Hz~10 KHz, and the initial base frequencies for all LEDs are identical. For obtaining the values in R-channel, G-channel and B-channel respectively, only one channel in the light source will be sensed at one time using concept of frequency multiplication.

Figure 5B:
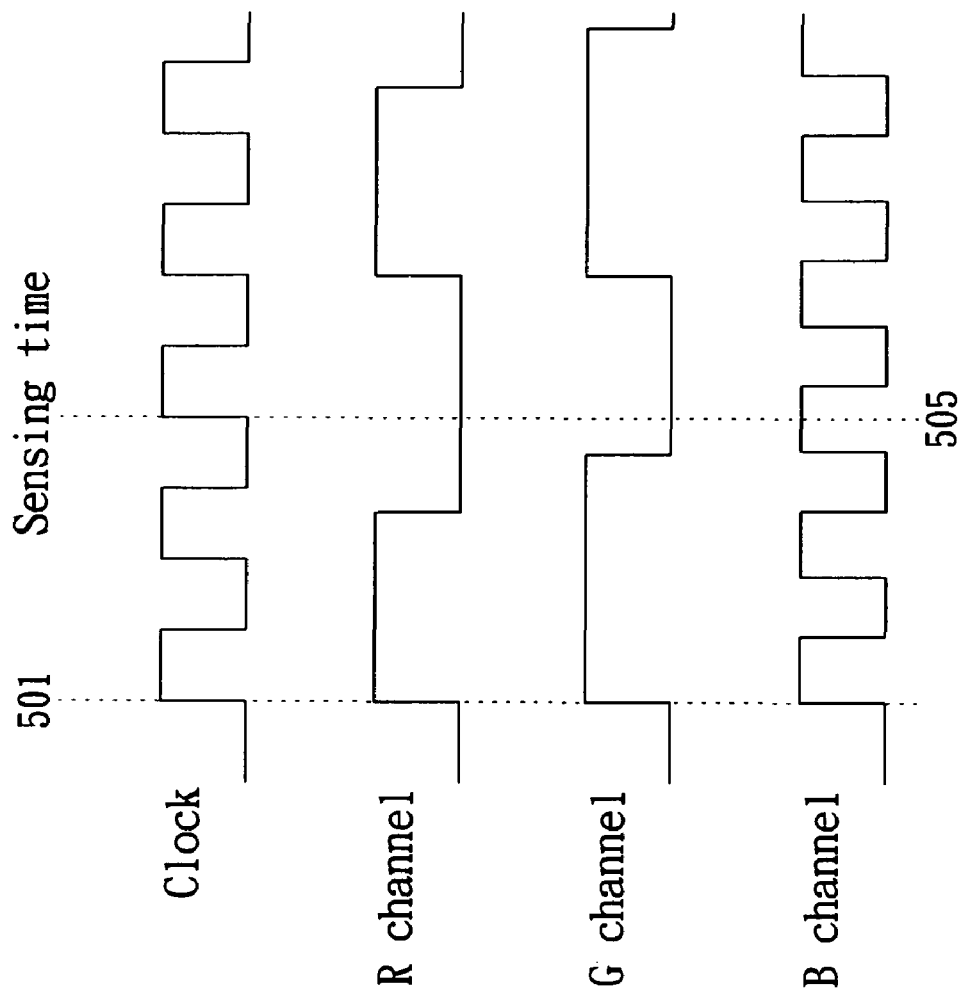

Referring to FIG. 5B, the data of B-channel can be retrieved by the light sensing unit 33 at the sensing time 505, in the meantime, the data from R-channel and G-channel won't be retrieved. The retrieved signals from the B-channel will be fed back to the driving controller 32 for reference to the calibration. After the retrieval step is completed, the frequency of B-Channel will be modulated back to its base frequency. Next, the method will follow the above steps as the same way in order to achieve the calibration of the other channels.

Figure 6:
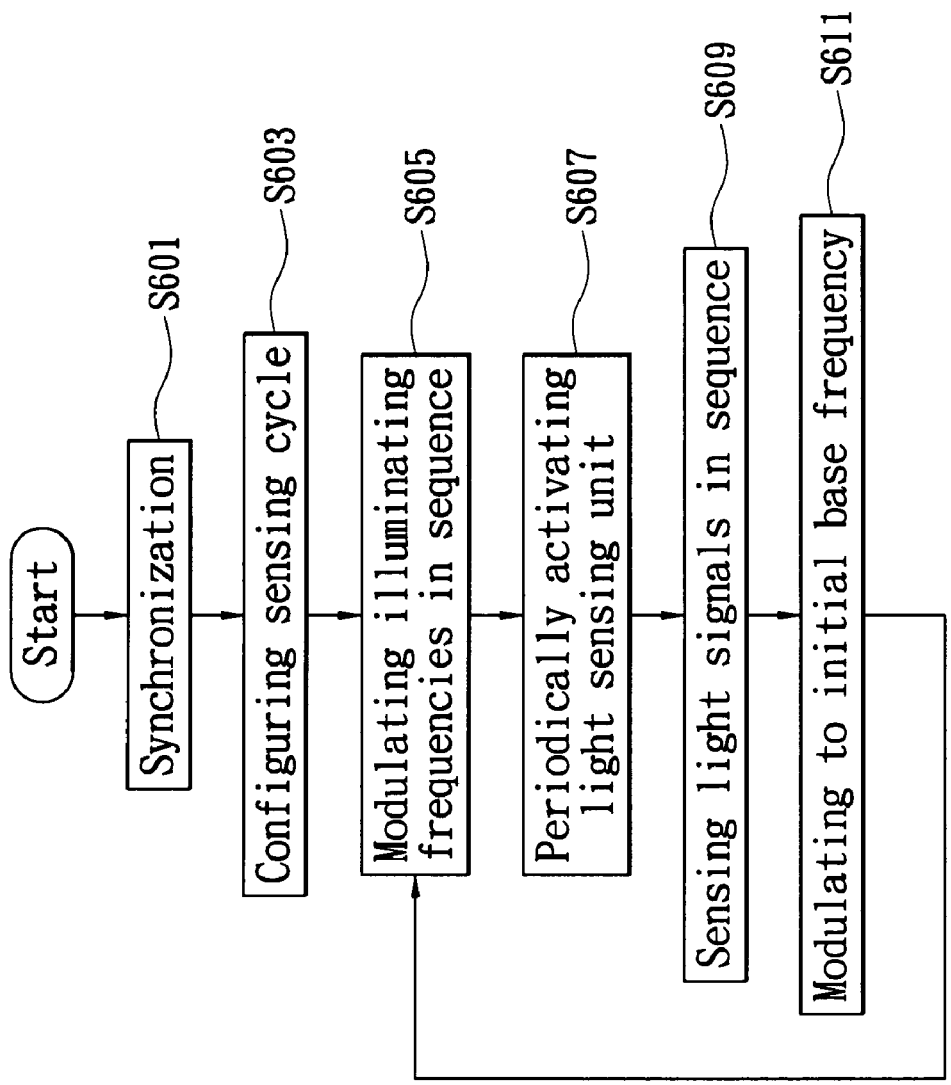
FIG. 6 shows a flow chart of the embodiment implementing the light sensing method of the present invention.

The light sensing method for the luminaire calibration of the preferred embodiment of the invention is illustrated in FIG. 6. In the beginning, the ideal intensity values of the red (R), green (G) and blue (B) are stored, and those ideal intensity values are used to be compared with the sensed values for further calibration. After powering on the luminaire, the pulse-width modulation technology is incorporated to modulate the currents for the LEDs. The provided voltage stabilizing circuit is further used for stabilizing the LEDs.

The sensing method provides a step S601 in the beginning, which is to synchronize clock of the data transmission channels of the plurality of LEDs. Next, the sensing cycle (switching cycle) of the light sensing unit 33 is configured, namely the light sensing unit 33 will be activated to process sensing steps in a specific period (step S603). Next, the illuminating frequencies of the LEDs will be modulated in sequence (step S605). According to the preferred embodiment of the invention, the mentioned pulse-width modulation technology is introduced to modulate the current for each LED for changing its, illuminating frequency. Therefore, the LEDs will be sensed by the lighting sensing unit 33 in sequence.

After that, the light sensing unit 33 can be activated and de-activated periodically based on the mentioned sensing cycle (step S607). As the light sensing unit 33 is switched on, only the light signals from one LED will be sensed at one time. The light sensing unit 33 will be switched off after it receiving the signals. Therefore, the light signals from the channels of the LEDs can be sensed in sequence during the period of activation and de-activation of the light sensing unit 33 (step S609).

At last, in order to process the next modulation and sensing steps after the above sensing steps, every LED is modulated back to the initial base frequency and recovered to its original status (step S611).

The above steps preferably embody the light intensity measurement and calibration of the luminaire having red, green and blue LEDs. According to the preferred embodiment, the three LEDs are modulated in sequence, and the light sensing unit 33 is used to sense the light signals in certain ranges of frequencies. For example, the driving controller 32 is used to modulate the illuminating frequency of a first light-emitting-diode module such as a red LED module, and the light sensing unit 33 is activated periodically to sense the light signals of the channel of the first light-emitting-diode module. After that, the sensed signals are fed back to the driving controller 32 for reference to the calibration. The first light-emitting-diode module is then modulated back to its initial base frequency, the proper emitting color. The mentioned light signals of each channel are compared with the ideal value for the calibration, such as to calibrate the color shift by the current modulation.

By the same sensing steps, the driving controller 32 is used to modulate the illuminating frequency of a second light-emitting-diode module such as a green LED module. The light sensing unit 33 is activated and de-activated periodically for sensing the light signals of the second light-emitting-diode module in a specific period. The second light-emitting-diode module is then modulated back to its initial base frequency, the proper emitting color.

Next, a third light-emitting-diode such as a blue LED module is modulated, and the light sensing unit 33 to be activated is also used to sense the light signals of the third light-emitting-diode module. The light sensing unit 33 is de-activated after the sensing steps. The third light-emitting-diode module is then modulated back to its initial base frequency for lighting a proper color.

After the above sensing steps, the light sensing unit 33 is switched off. Further, the next channel is active for modulation and sensing process since the current channels of the LEDs are modulated back to their original frequencies. The calibration is achieved by repeatedly changing the channels.

Through the claimed major steps, the cyclic sensing steps are configured for sensing one single channel at one time, and the LEDs can be calibrated in accordance with the comparison between the sensed light signals for each channel and the ideal values.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A light sensing method for luminaire calibration, comprising:
storing an ideal intensity value of each channel of a plurality of light-emitting diodes (LED);
synchronizing initial base frequencies of the LEDs for ensuring synchronization of light signals of channels of the LEDs by aligning rising edges of the light signals according to a base clock;
modulating illuminating frequencies of the LEDs in a predetermined sequence, based on a switching cycle of a light sensing unit;
activating and de-activating the light sensing unit periodically;
sensing the light signal of the channel of each LED in the predetermined sequence by the light sensing unit;
modulating the modulated illuminating frequencies of the LEDs to reach their corresponding initial base frequencies in the predetermined sequence;
configuring the switching cycle to ensure the light signal from only one channel is sensed at one time; and
executing a calibration according to a comparison between the sensed light signal of each channel and the ideal intensity value.

2. The method of claim 1, wherein the method further comprises configuring the switching cycle of the light sensing unit, so as to activate and de-activate the light sensing unit periodically.

3. The method of claim 1, wherein modulating the modulated illuminating frequencies of the LEDs uses a pulse width with an identical frequency to modulate a current of each LED.

4. A light sensing method for luminaire calibration, wherein a single light sensing unit is used to sense light intensities of a plurality of LED modules including a first LED module, a second LED module, and a third LED module, the method comprising:
storing an ideal intensity value of each channel of the LED modules;
synchronizing initial base frequencies of channels of the LED modules for ensuring an synchronization of light signals of the channels of the LED modules by aligning rising edges of the light signals according to a base clock;
modulating an illuminating frequency of the first LED module by a driving controller;
activating the light sensing unit;
sensing the light signal from the channel of the first LED module;
de-activating the light sensing unit;
modulating the modulated illuminating frequency of the first LED module to its initial base frequency;
modulating an illuminating frequency of the second LED module by the driving controller;
activating the light sensing unit;
sensing the light signal of the channel of the second LED module;
de-activating the light sensing unit;
modulating the modulated illuminating frequency of the second LED module to its initial base frequency;
modulating an illuminating frequency of the third LED module by the driving controller;
activating the light sensing unit;
sensing the light signal of the channel of the third LED module;
de-activating the light sensing unit;
modulating the modulated illuminating frequency of the third LED module to its initial base frequency;
configuring a switching cycle of the light sensing unit to ensure the light sensing unit is activated and de-activated periodically with the light signal from only one channel is sensed at one time; and
executing a calibration according to a comparison between the sensed light signal of each channel and the ideal intensity value.

5. The method of claim 4, wherein modulating the modulated illuminating frequencies of the first, the second, and the third LED modules comprises modulating a current for each of the first, the second, and the third LED modules based on a pulse width with an identical frequency.

6. A light sensing apparatus for luminaire calibration, comprising:
a plurality of LEDs;
a plurality of regulating units electrically connected with the LEDs for regulating currents inputted to the LEDs;
a light sensing unit for retrieving light signals from the LEDs;
a driving controller electrically connected with the regulating units for storing an ideal intensity value of each LED and controlling an outputted power and a driving frequency, and electrically connected with the light sensing unit for retrieving sensing signals from the light sensing unit; and a switching unit disposed between the light sensing unit and the driving controller for switching the light sensing unit;

wherein, the light sensing unit is periodically activated and de-activated by the switching unit;

wherein the driving controller synchronizes initial base frequencies of the LEDs according to a base clock by aligning rising edges of the light signals, and incorporates a frequency-modulation means to modulate the initial base frequencies of the light signals of the LEDs in a predetermined sequence, so that the light sensing unit senses light intensities of the light signals of the LEDs in a switching cycle of the light sensing unit and the driving controller executes a calibration according to a comparison between the sensed light signal of each LED and the ideal intensity value.

7. The light sensing apparatus of claim 6, wherein the switching unit is a switching device disposed between the light sensing unit and the driving controller, and a switching operation thereof is controlled by the driving controller.

8. The light sensing apparatus of claim 6, wherein the switching unit is a switching program installed in the driving controller, and the switching program is a firmware program in the driving controller.

9. The light sensing apparatus of claim 6, wherein the apparatus further includes a diffuser for enhancing sensing accuracy of the light intensity by the light sensing unit.

10. The light sensing apparatus of claim 6, wherein the apparatus further includes a user interface.

* * * * *